United States Patent Office 3,154,511
Patented Oct. 27, 1964

3,154,511
STABILIZATION OF ACRYLONITRILE POLYMERS
Heino Logemann, Leverkusen, and Ernst Roos, Cologne-Flittard, Germany, assignors to Farbenfabriken Bayer Aktiengesellschaft, Leverkusen, Germany, a corporation of Germany
No Drawing. Filed July 21, 1960, Ser. No. 44,293
Claims priority, application Germany Aug. 13, 1959
8 Claims. (Cl. 260—30.4)

The present invention relates to a process for the production of shaped articles from acrylonitrile polymers which articles show a marked white tone and exhibit a low tendency to discoloration.

The heat stability of shaped articles, such as filaments or fibers of acrylonitrile polymers is generally insufficient. For the production of these articles, solutions are used which preferably contain dimethyl formamide as solvent. Attempts have already been made to improve the thermo-stability of such shaped articles by adding stabilizers to the solutions prior to the processing thereof. For this purpose, it is mainly acid substances which have been used in order to combine the basic impurities contained in the dimethyl formamide. However, such additives have become unimportant since dimethyl formamide of a sufficiently pure quality became available. Moreover, a distinct yellowing effect is to be observed under thermal stressing, especially in the presence of oxygen, even when these products are added. Even when using relatively pure dimethyl formamide which is now available, shaped articles are obtained which have insufficient thermal stability.

It is an object of the present invention to provide shaped articles from acrylonitrile polymers which have a remarkable white tone and exhibit a very low tendency to discoloration under heat. Another object is to provide a process for the production of these shaped articles. A further object is to attain these aims by means of certain agents which are added to the solution to be shaped. Still further objections will become apparent hereinafter.

It has now been found that thermally very stable shaped articles of acrylonitrile polymers, advantageously fibers and foils, are obtained from solutions of acrylonitrile polymers if acid hydrazides of aliphatic dicarboxylic acids are added to the solvents prior to, during, or after the dissolving of the acrylonitrile polymers and only then are the solutions formed into shaped articles.

The stabilizers according to the invention are acid hydrazides of aliphatic dicarboxylic acids. These acid hydrazides are built up on the one hand from hydrazine components and on the other hand from aliphatic dicarboxylic acids. Considered as hydrazine components are unsubstituted hydrazine and also hydrazines substituted on one nitrogen atom; more especially included herein is phenyl hydrazine.

Unsubstituted and also substituted dicarboxylic acids are considered as aliphatic dicarboxylic acids and the following are mentioned in detail: oxalic, maleic, adipic, glutaric, pimelic and succinic acids.

Especially suitable for the process of the invention are also the acid hydrazides of those aliphatic dicarboxylic acids of which the carboxyl groups are interconnected not only by aliphatic bridges, but also by hetero atoms, such as sulphur. Condensation products of mercapto acids with aldehydes or ketones have proved especially suitable. These dicarboxylic acids can be represented by the following general formula:

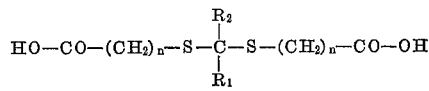

in which $R_1$ and $R_2$ each represent a hydrogen atom, an alkyl radical having 1 to 12 carbon atoms or an aryl radical, such as phenyl, and $n$ represents a whole number between 1 and 6.

For the preparation of such dicarboxylic acids which contain sulphur, 2 mols of the corresponding mercapto acid are reacted in a manner known per se with 1 mol of aldehyde or ketone. Formaldehyde, acetaldehyde, butyr-aldehyde and benzaldehyde are especially considered as suitable aldehydes and acetone, diethyl ketone and cyclohexanone as suitable ketones. These dicarboxylic acids are transformed in the usual manner by way of the esters into the acid hydrazides. If unsubstituted hydrazine is used as the hydrazine component, the two terminal primary amino groups which then result can be transformed with acetone into the corresponding isopropylidene hydrazones. They are generally only sparingly soluble in water and fall within the definition, according to the invention, of acid hydrazides of aliphatic dicarboxylic acids.

The quantity of acid hydrazides to be added is between 0.1 and 5%, related to dissolved acrylonitrile polymer, and advantageously between 0.5 and 2%.

By acrylonitrile polymers, there are understood both homopolymers and copolymers of acrylonitrile. Suitable copolymerization components are for example: acrylic and methacrylic acid esters, vinyl chloride, vinylidene chloride, vinyl acetate and styrene. There are also to be considered copolymers of acrylonitrile with those vinyl compounds which are added to improve the dyeing capacity, such as for example styrene-sulphonic acids, etc. The nature of the copolymers of the acrylonitrile is not critical as regards the addition of acid hydrazide stabilizers according to the invention.

The stabilizers according to the invention can be added to all conventional solutions of acrylonitrile polymers which are suitable for the shaping operation. The content of polymers in these solutions depends on the nature of the polymers, the nature of the solvent and the level of the molecular weight of the polymers, as well as the method of shaping, but generally the solutions contain between 10 and 35% of acrylonitrile polymer.

As solvents for the production of the solutions, it is possible to employ all conventional solvents which are able to dissolve acrylonitrile polymers with a high acrylonitrile content, and these include essentially dimethyl formamide, dimethyl acetamide, dimethyl sulphone, ethylene glycol carbonate and butyrolactone.

Improvements in the discoloration under heat of up to 50% can be produced by the addition of the compounds of the present invention, without impairing the technological properties.

The present invention is further disclosed in the following examples which are illustrative but not limitative thereof.

EXAMPLE 1

10% solutions of a copolymer of 95 parts by weight of acrylonitrile and 5 parts by weight of methyl acrylate in dimethyl formamide are prepared by dissolving 2% by weight of oxalic acid dihydrazide, adipic acid dihydrazide or oxalic acid bisphenyl-hydrazide in the dimethyl formamide before adding the polymer (the said 2% being related to the polymer). Films of equal layer thickness and prepared from the solutions are heated in a circulating air drying chamber for 1-2 hours at 160° C. The yellow coloring which occurs is compared with the discoloration of a film which is produced in the same way but without addition of the substances according to the invention. The yellowish-brown discolorations which occur are 30 to 50% less with the aforesaid additives than in the experiment in which they are not used.

EXAMPLE 2

Spinning solutions of polyacrylonitrile in dimethyl formamide (20–29%) have added thereto 0.5%, 1% and 2%, respectively, related to polyacrylonitrile, of methylene bis-thioglycolic acid hydrozide, which had been prepared from the ethylester of methylene-bis-thioglycolic acid and 2 mols of hydrazine and corresponds to the formula $$NH_2NH.COCH_2S—CH_2—SCH_2CONHNH_2$$

The filaments obtained by the dry spinning process, after being stretched and washed, show a 40% improvement in the white tone of the raw fibers. After a heat treatment at 160° C., the improvement in the fiber tone is still 20%. Dyeings of the fibers are correspondingly clearer.

Instead of the said highly water-soluble product, its water-soluble reaction product with acetone can be used with equal success. The acetone reacts with the two terminal primary amino groups to form the corresponding isopropylidene-hydrazones. Instead of using formaldehyde in the production of the thioacetate, it is also possible to use acetaldehyde, butyraldehyde or benzaldehyde, as well as ketones, such as acetone, diethyl ketone or cyclohexanone, even if the latter products are slightly less effective.

Methylene-bis-thioglycol acid hydrazide is prepared by esterifying methylene-bis-thioglycolic acid with ethyl alcohol to methylene-bis-thioglycolic acid ethyl ester and by further reaction of this ester with hydrazine hydrate.

(1) Methylene-Bis-Thioglycolic Acid Ethyl Ester 131 parts by weight (0.67 mol) of methylene-bis-thioglycolic acid are boiled under reflux for 4 hours with 300 parts by volume of ethyl alcohol and 4 parts by volume of concentrated sulphuric acid. After cooling, the mixture is poured into 500 parts by volume of water, the ester separating out as a light yellow oil. Yield: 170 parts by weight (=70% of the theoretical).

$C_9H_{16}O_4S_2$—molecular weight 252:

|            | C    | H   | S    |
|------------|------|-----|------|
| Calculated | 42.8 | 6.3 | 25.4 |
| Found      | 42.7 | 6.3 | 25.5 |

(2) Methylene-Bis-Thioglycolic Acid Hydrazide 117 parts by weight (0.46 mol) of methylene-bis-thioglycolic acid ethyl ester are dissolved in 250 parts by volume of ethyl alcohol and 55 parts by weight (1.1 mols) of hydrazine hydrate are added dropwise. With spontaneous heating of the reaction mixture, the dihydrazide separates out in solid form. The mixture is heated for 1 hour to boiling point and is filtered with suction after cooling. There are obtained 92 parts by weight (=95% of the theoretical) of colorless crystals having the melting point 108–110° C.

$C_5H_{12}N_4O_2S_2$—molecular weight 224:

|                  | C    | H   | N    | S    |
|------------------|------|-----|------|------|
| Calculated Percent | 26.8 | 5.4 | 25.0 | 28.6 |
| Found do         | 27.1 | 5.4 | 25.2 | 28.4 |

From the dihydrazide described above, the corresponding dihydrazone is prepared by reaction with acetone.

(3) Methylene-Bis-Thioglycolic Acid Isopropylidene Hydrazone

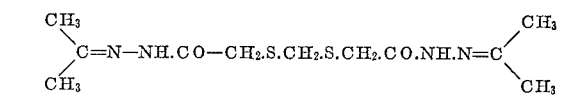

112 parts by weight (0.5 mol) of methylene-bis-thioglycolic acid hydrazide are suspended in 250 parts by volume of methanol and 64 parts by weight (1.1 mols) of acetone are added dropwise at 60–64° C. After boiling for 2 hours under reflux, colorless crystals have separated out. These are filtered with suction after cooling, washed with ether and dried in vacuo at 70–80° C. Yield: 145 parts by weight (=87% of the theoretical), M.P. 171–174° C.

$C_{11}H_{20}N_4O_2S_2$—molecular weight 304:

|                  | C    | H   | N    | S    |
|------------------|------|-----|------|------|
| Calculated Percent | 43.5 | 6.6 | 18.4 | 21.3 |
| Found do         | 43.3 | 6.4 | 18.0 | 20.8 |

The dihydrazone has a stabilizing effect which is equal to that of the hydrazide.

The other substituted bis-methylene-thioglycolic acid esters prepared with the aid of other aldehydes, such as acetaldehyde and benzaldehyde, or ketones such as acetone and cyclohexanone, can be reacted in an entirely similar manner.

We claim:

1. A solution of an acrylonitrile polymer containing a major amount by weight of acrylonitrile in a solvent selected from the group consisting of dimethyl formamide, dimethyl acetamide, dimethyl sulfone, ethylene glycol carbonate, and butyrolactone, said solution containing from about 0.5–2.0% of a saturated acid hydrazide selected from the group consisting of oxalic acid dihydrazide, adipic acid dihydrazide, methylene-bis-thioglycolic acid hydrazide and methylene-bis-thioglycolic acid isopropylidene hydrazone.

2. The solution of claim 1 wherein the hydrazide is oxalic acid dihydrazide.

3. The solution of claim 1 wherein the hydrazide is adipic acid dihydrazide.

4. The solution of claim 1 wherein the hydrazide is methylene-bis-thioglycolic acid hydrazide.

5. The solution of claim 1 wherein the hydrazide is methylene-bis-thioglycolic acid isopropylidene hydrazone.

6. A process for the preparation of acrylic filaments which comprises dry-spinning the acrylonitrile polymer solution of claim 1 into filaments which are characterized by their remarkably white tone and their resistance to discoloration when heated.

7. The process of claim 6 wherein the acrylonitrile polymer is a copolymer of 95 parts by weight acrylonitrile and 5% by weight methyl acrylate.

8. The process of claim 6 wherein the acrylonitrile polymer is polyacrylonitrile.

References Cited in the file of this patent

UNITED STATES PATENTS

| 2,764,570 | Kowolik et al. | Sept. 25, 1956 |
| 2,810,708 | Kubico et al. | Oct. 22, 1957 |
| 2,878,210 | Holmes et al. | Mar. 17, 1959 |